INVENTOR.
HERMANN WITTNEBEN

United States Patent Office 3,451,461
Patented June 24, 1969

3,451,461
PNEUMATIC VEHICLE TIRE
Hermann Wittneben, Hannover, Germany, assignor to Continental Gummi-Werke Aktiengesellschaft, Hannover, Germany
Filed Oct. 3, 1966, Ser. No. 583,523
Claims priority, application Germany, Oct. 9, 1965, C 37,106
Int. Cl. B60c 9/02, 11/00
U.S. Cl. 152—356                6 Claims

ABSTRACT OF THE DISCLOSURE

A pneumatic vehicle tire with reinforcing layer means extending substantially over the width of the tread strip and comprising pull resistant strength members extending at an angle with regard to the circumferential direction of the tire the side walls of which having incorporated therein half carcasses with strength members extending at least approximately at a right angle with regard to the circumferential direction of the tire, the marginal areas of said reinforcing layer means and the adjacent marginal areas of said half carcasses forming overlapping zones in the tire shoulder area while the strength members of said reinforcing layer means within the said overlapping zones form an angle with the tire circumferential direction which is materially greater than the angle formed by the strength members of the reinforcing layer means with the tire circumferential direction within the area intermediate said two overlapping zones.

---

The present invention relates to a pneumatic vehicle tire with two half carcasses extending through the two side walls of the tire, and with an annular pull resistant reinforcing insert extending substantially over the width of the tread strip and comprising strength members such as threads, bands, cables, or the like, which cross each other, the marginal portion of the belt-like reinforcing insert, and the marginal portions of the half carcasses overlapping each other.

With tires of the above-mentioned type it is known to select the overlapping zone so wide that between the reinforcing insert and the two half carcasses there will be formed a sufficiently safe connection formed by the rubber enveloping layers vulcanized thereto.

It is an object of the present invention so to improve tires of the above-mentioned type that within the range of the above-mentioned overlapping zones, a more favorable merging portion with regard to strength will be obtained.

It is another object of this invention to obtain an improved tire as set forth in the preceeding paragraph, which will also be stronger in the area of the said overlapping zone when the strength members of the two half carcasses extend at a right angle or approximately a right angle with regard to the circumferential direction of the tire.

These and other objects and advantages of the present invention will appear more clearly from the following specification in connection with the accompanying drawing, in which.

Figure 1:
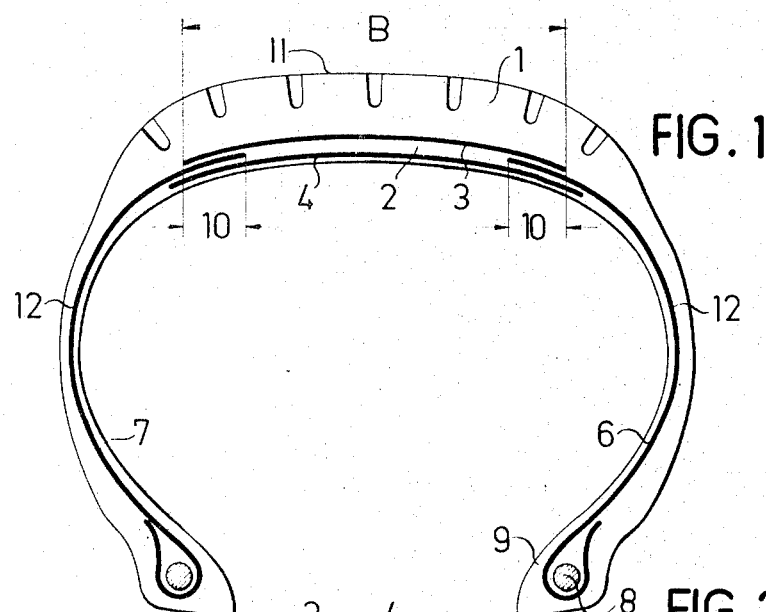
FIGURE 1 represents a radial partial section through a pneumatic vehicle tire according to the present invention.
Figure 2:
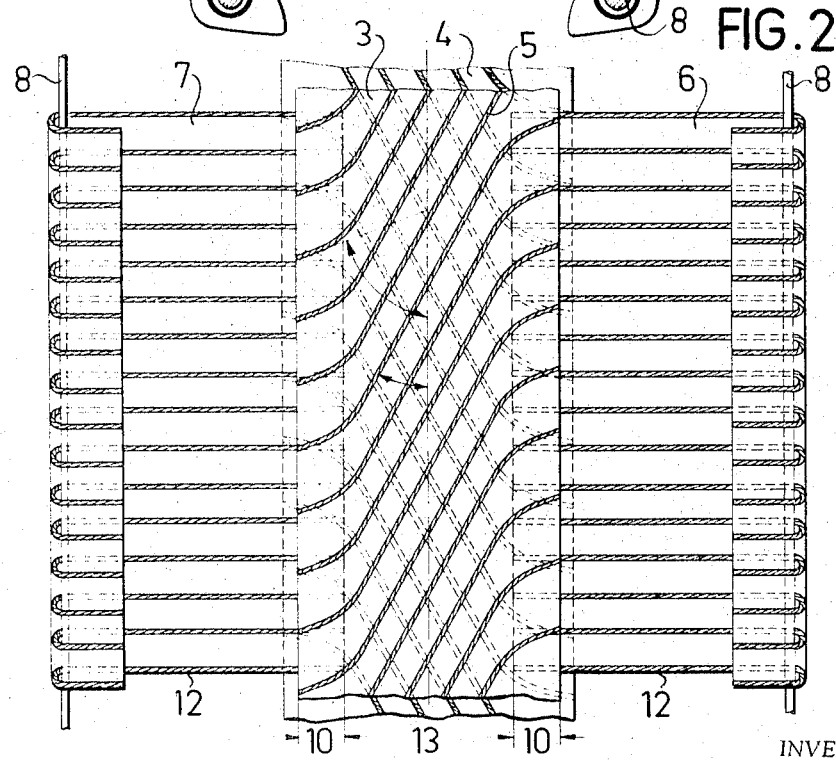
FIGURE 2 shows the reinforcement of the tire according to FIG. 1 when placed in one plane.

A pneumatic vehicle tire according to the present invention is characterized primarily in that within the range of the overlapping zone, the strength members forming part of the reinforcing insert, form with the circumferential direction of a tire a considerably greater angle than in the central section of the reinforcing insert, between the two overlapping zones. Advantageously, the strength members at the marginal areas of the reinforcing insert are rounded toward the tire beads, preferably in such a way that all strength members of the reinforcing insert in a finished tire have approximately the shape of a flat S, while the bent portions, and, if desired, also the angled off portions extend through the above-mentioned overlapping zone.

By designing the reinforcing inserts or its strength members in the above-outlined manner, a particularly durable merging zone will be obtained because the difference in the angle of the threads of the half carcasses, and the strength members of the reinforcing insert within the overlapping zone is relatively small. Moreover, with such a reinforcing insert, in comparison to other heretofore known tires, an undesired stiffening within the range of the already massive tire shoulders will be avoided.

Referring now to the drawing in detail, the pneumatic tire illustrated therein and composed primarily of rubber material, has below its tread strip 1 an annular reinforcing insert 2, which is pull resistant in the circumferential direction of the tire, and which extends substantially over the width of the tread strip 1. The said reinforcing insert 2 comprises two layers 3 and 4, of parallel pull resistant strength members, e.g. in the form of threads, which are parallel to each other in each layer. The threads 5 of one layer, however, extend along one inclined direction, whereas the threads 5 of the other layer extend in an opposite slant direction, the threads 5 forming with the circumferential direction of the tire, an angle of preferably from 10 to 30 degrees.

The tire body is reinforced by two half carcasses 6 and 7, which in a manner known per se, are anchored in the tire beads 9 by being folded around the bead cords 8 and are extended in the direction toward the reinforcing insert 2 to such an extent that there is formed an overlapping zone 10 approximately below the two marginal areas of the tread surface 11. The strength members, e.g. threads 12, of the two half carcasses 6 and 7 extend at a right angle, or for all practical purposes at a right angle with regard to the circumferential direction of the tire.

With the tire according to the present invention, the threads 5 of the reinforcing insert 2 do not extend along a straight line from one to the other marginal area of the reinforcing insert 2 but instead are within the range of the overlapping zone 10, and, if desired, already slightly ahead of the overlapping zone, bent off in the direction toward the tire beads 9. Therefore, the threads 5 follow the contour of a flat S. As a result thereof, the angle formed by the threads 5 in the direction of the overlapping zone 10 with the circumferential direction of the tire is considerably greater than within the range 13 located therebetween. This difference amounts to from 20 to 40 degrees. Therefore, in the overlapping zones 10 which are decisive for the strength of the entire reinforcement of the tire body, the location or position of threads 5 is somewhat approaching that of threads 7 whereby a merging is obtained which is particularly favorable with regard to strength conditions. In view of this design of the reinforcing insert, it is also possible to select a relatively small width for the overlapping zone. This, in turn, brings about that the overlapping will result in no or practically no additional stiffening. This effect is further aided by the feature that the threads 5 are arranged approximately in conformity with the course of the threads 12, and that threads which with the circumferential direction of the tire form relatively large angles, are with regard to the deformability and the flexibility of the tire body more favorable than threads which extend at a relatively small angle with regard to the circumferential direction of the tire.

According to the specific embodiment illustrated in the drawing, the reinforcing insert 2 has two symmetrically arranged layers, whereas the two half carcasses 6, 7, each comprise one cord layer only, however, it is within the scope of the present invention to provide additional layers. Thus, for instance, the two half carcasses 6, 7 may have two layers, and the reinforcing insert 2 may be composed of four superimposed cord layers.

Generally, satisfactory strength of the tire will be assured when the width of the overlapping zone 10 amounts to approximately from 10 to 20 percent of the width B of the tread strip.

It is, of course, to be understood, that the present invention is, by no means, limited to the particular construction shown in the drawings, but also comprises any modifications within the scope of the appended claims. It is also to be understood that the term "strength members" as it appears in the specification and claims natural and synthetic fiber threads, wires, strands and cables.

What I claim is:

1. A pneumatic vehicle tire having a tread strip, side walls, and two shoulder zones respectively interconnecting said tread strip and said side walls, which includes: annular reinforcing means extending approximately over the width of said tread strip and comprising strength members; and two half carcasses respectively located in said side walls and comprising strength members extending at least nearly at a right angle with regard to the circumferential direction of said tire and into the respective adjacent marginal area of the strength members of said annular reinforcing means so that the marginal portions of the strength members of said annular reinforcing means and the respective adjacent portions of the strength members in said lateral walls overlap each other within said shoulder zones only; the strength members of said reinforcing means within the zones of overlapping with the strength members of said side walls forming an angle with the circumferential direction of said tire which is considerably greater than the angle formed by the strength members of said reinforcing means between said two overlapping zones with the circumferential direction of the tire.

2. A pneumatic tire according to claim 1, in which the strength members of said annular reinforcing means have each the shape of a flat stretched out S.

3. A pneumatic tire according to claim 1, in which the angle formed by the strength members of said reinforcing means with the strength members of said side walls in said zones of overlapping is from 20 to 40° larger than the angle formed by the strength members of said reinforcing means between said overlapping zones with the circumferential directions of the tire.

4. A pneumatic tire according to claim 1, in which the strength members of said annular reinforcing means between said overlapping zones form with the circumferential direction of said tire angles of from 10 to 30°.

5. A pneumatic tire according to claim 1, in which the width of each of said overlapping zones amounts to approximately from 10 to 20% of the width of said tread strip.

6. A pneumatic tire according to claim 1, in which the end portions of the strength members of said annular reinforcing means respectively bend toward the strength members of the respective adjacent half carcass before reaching the respective adjacent overlapping zone.

References Cited

UNITED STATES PATENTS

| | | | |
|---|---|---|---|
| 3,062,259 | 11/1962 | Boussu | 152—356 |
| 3,074,456 | 1/1963 | Neuville | 152—354 |
| 3,275,056 | 9/1966 | Menell | 152—356 |
| 3,292,681 | 12/1966 | Travers | 152—354 |
| 3,327,753 | 6/1967 | Travers | 152—356 |

ARTHUR L. LA POINT, *Primary Examiner.*

CHARLES B. LYON, *Assistant Examiner.*

U.S. Cl. X.R.

152—361